(No Model.)
A. J. LARKIN.
STUMP PULLER.
No. 519,263. Patented May 1, 1894.
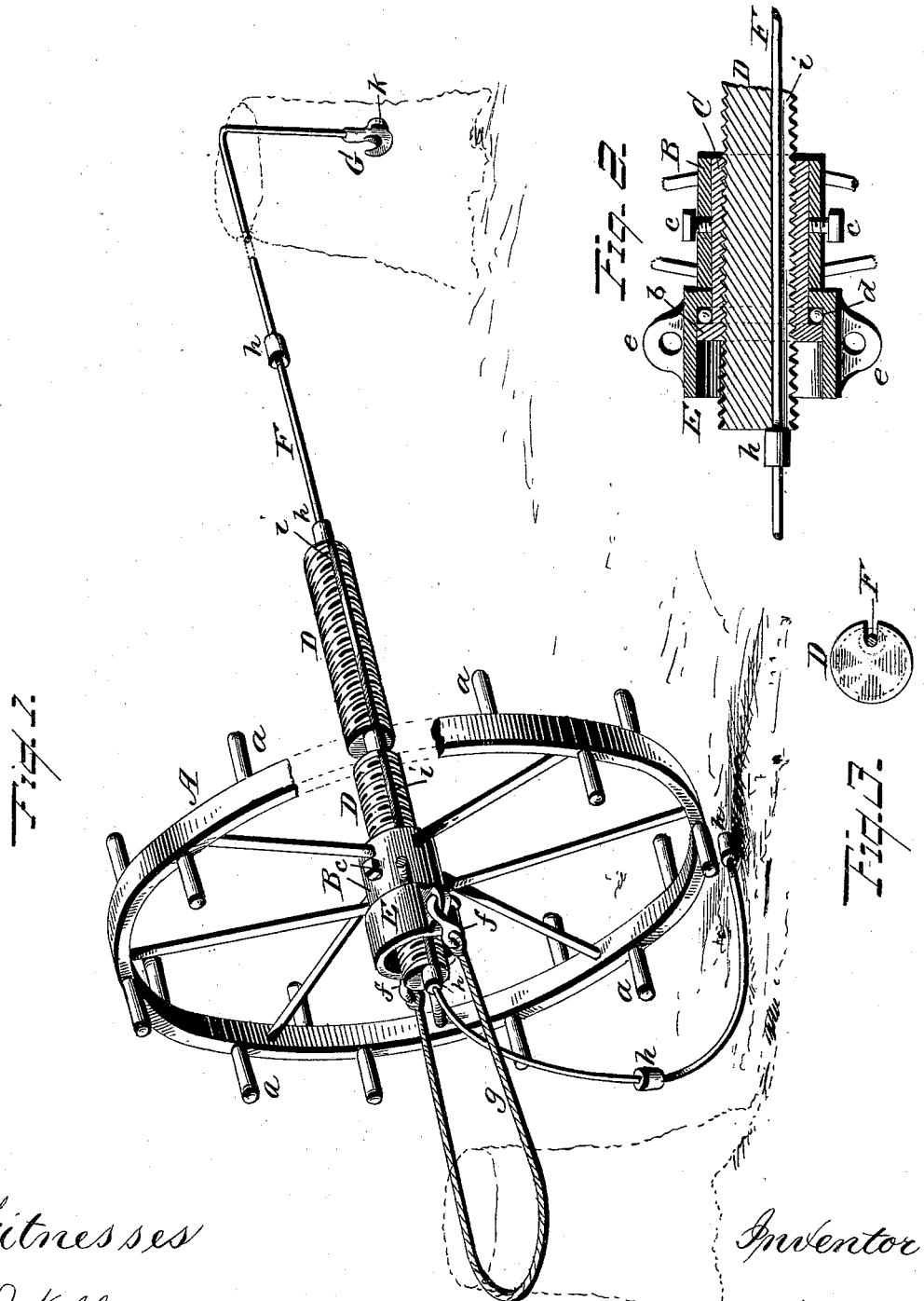
Witnesses
C. J. Williamson
M. J. Manning
Inventor
Arthur J. Larkin
per Chas. H. Fowler.
Attorney.
THE NATIONAL LITHOGRAPHING COMPANY,
WASHINGTON, D. C.

UNITED STATES PATENT OFFICE.

ARTHUR JOSEPH LARKIN, OF COUNCIL BLUFFS, IOWA.

STUMP-PULLER.

SPECIFICATION forming part of Letters Patent No. 519,263, dated May 1, 1894.

Application filed August 31, 1893. Serial No. 484,513. (No model.)

*To all whom it may concern:*

Be it known that I, ARTHUR JOSEPH LARKIN, a citizen of the United States, residing at Council Bluffs, in the county of Pottawattamie and State of Iowa, have invented certain new and useful Improvements in Stump-Pullers; and I do hereby declare that the following is a full, clear, and exact description of the same, reference being had to the annexed drawings, making a part of this specification, and to the letters of reference marked thereon.

The present invention has for its object to provide a simple and effective device for pulling stumps from the ground whereby great power is obtained, the loosening of the stump and removing it from the earth is rendered simple and easily accomplished and the operation of the parts perfect in their action as well as possessing strength and durability.

The invention consists in a device constructed substantially as shown in the drawings and hereinafter described and claimed.

Figure 1 of the drawings represents a perspective view of my improved stump-puller in position for operation; Fig. 2 a detail sectional view of the operating parts thereof on an enlarged scale; Fig. 3 an end view of the tension-screw with the wire located in the groove thereof, the wire being shown in section.

In the accompanying drawings A represents a suitable hand wheel which may have a plurality of hand-holds *a* or any other preferred and well known means for turning the wheel. This wheel which may be constructed in any desirable manner which is provided with a head B which in the present instance would be considered the hub of the wheel.

Instead of providing the head with a rim, spokes and hand-holds for turning it, any suitable means may be employed for turning the head in place of the wheel shown.

The head B may be formed with or provided with a screw threaded feeding sleeve C having at one end a circumferential flange *b*. This head and screw threaded feeding sleeve when formed separate are connected together by set-screws *c*, keys, or other well known means so that when the head is turned the sleeve will be carried with it. The interior screw threads of the sleeve C engage with exterior screw threads upon a tension screw D, and when the head is turned it will cause the tension screw to feed or move forward in a direction toward the wheel.

Upon the end of the tension sleeve C is a swivel coupling E and between the flange *b* of the sleeve and the flange of the coupling are ball-bearings *d* so as to decrease the friction and enable the sleeve to turn with the head more easily. The coupling E is provided with eye-plates *e* or other suitable means for attaching thereto a chain or rope *g* through the medium of suitable hooks *f* or other like fastenings, said chain or rope being secured to a tree, stump, or other suitable stationary object within convenient position to the stump to be pulled. A flexible wire cable F is provided which has upon one end a knife-edged hook G with head *k* by which it can be driven into the stump to be pulled, or any suitable hook or similar device may be substituted for that shown. The wire cable F has buttons *h* thereon to admit the tension screws D engaging with the wire between the buttons, a longitudinal groove *i* being formed in the screws for that purpose. Any number of these tension screws may be used as found desirable, and when the device is in position shown in Fig. 1 with the wire cable engaging with the stump to be pulled and the chain or rope engaging with some stationary object, by turning the wheel A the tension-screws will be moved along through the medium of the screw threaded feeding sleeve engaging therewith, and carry with it the wire cable, as the buttons on the cable prevent the tension screw from slipping thereon or moving independently thereof. The grooves in the tension-screws enable them to be taken off or replaced at pleasure.

Having now fully described my invention, what I claim as new, and desire to secure by Letters Patent, is—

1. In a stump-puller, a suitable wire-cable provided with means for connecting it to the stump to be pulled, one or more tension screws having longitudinal grooves for engaging with the cable, buttons or stops upon the cable, and means for moving forward the screws, substantially as and for the purpose described.

2. A stump-puller consisting of a suitable cable provided with means for connecting it with the stump to be pulled, one or more longitudinally grooved tension-screws engaging with the cable, buttons or stops upon the cable, a screw thread feeding-sleeve engaging with the tension screw, and a swivel coupling upon the sleeve, and means for connecting the sleeve with a stationary object, and suitable means for turning the sleeve whereby the tension screw is operated, substantially as and for the purpose set forth.

In testimony that I claim the above I have hereunto subscribed my name in the presence of two witnesses.

ARTHUR JOSEPH LARKIN.

Witnesses:
AUG. BERESHEIM,
THE. LASKOUSKI.